Sept. 2, 1969     R. H. OVERCASHIER ET AL     3,464,967
CIRCULATING SOLIDS DISPERSED IN A LIQUID
Original Filed Dec. 14, 1961
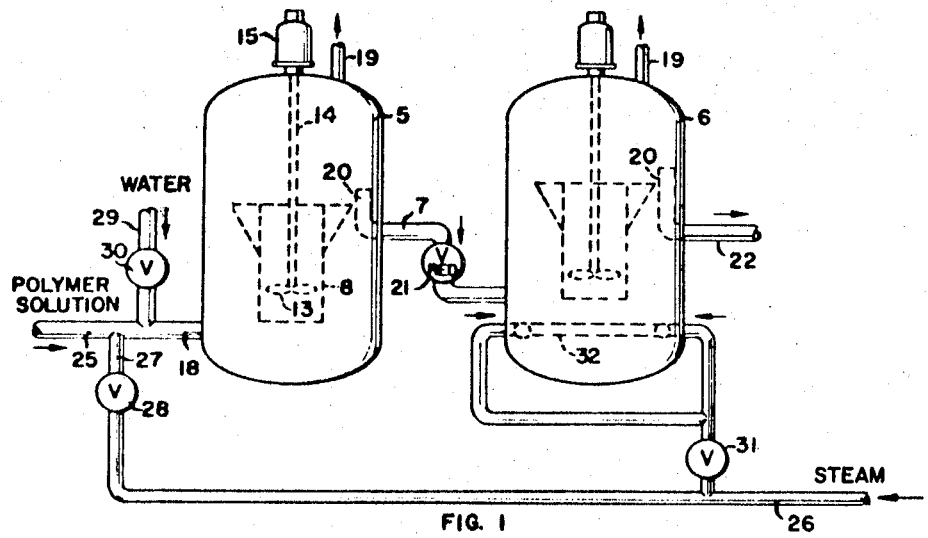
FIG. 1
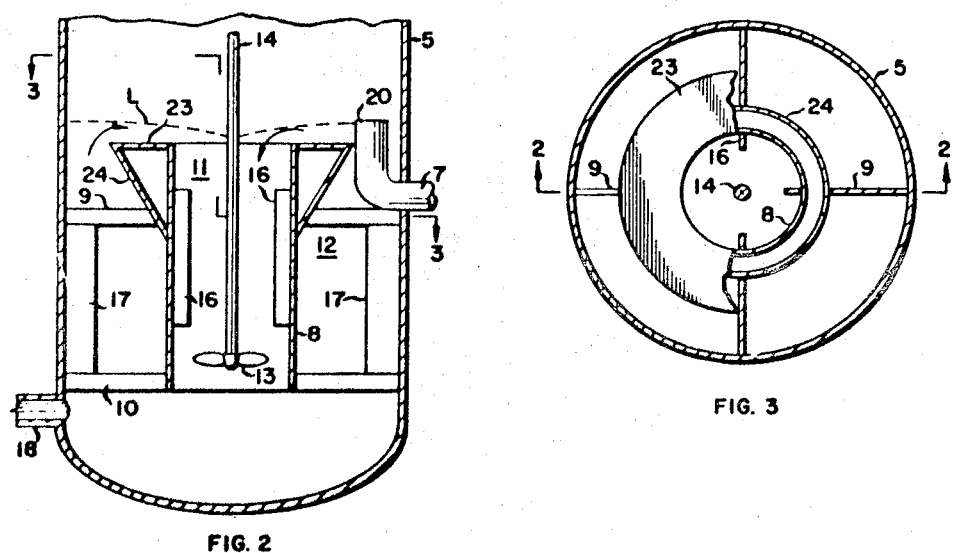
FIG. 2
FIG. 3
INVENTORS:
ROBERT H. OVERCASHIER
CHARLES E. SANBORN
BY:
THEIR ATTORNEY

# United States Patent Office 3,464,967
Patented Sept. 2, 1969

3,464,967
CIRCULATING SOLIDS DISPERSED IN A LIQUID
Robert H. Overcashier and Charles E. Sanborn, Walnut Creek, Calif., assignors to Shell Oil Company, New York, N.Y., a corporation of Delaware
Division of application Ser. No. 159,379, Dec. 14, 1961. Continuation of application Ser. No. 407,124, Oct. 28, 1964. This application Jan. 19, 1967, Ser. No. 610,456
Int. Cl. C08f 1/88, 1/98
U.S. Cl. 260—94.7                           1 Claim

ABSTRACT OF THE DISCLOSURE

A method of circulating polymer crumb solids in a liquid which method requires considerably less power comprising (1) moving the slurry downward through a first circulating zone (2) moving the slurry upward through a second vertical circulation zone at a slower rate than that of the first zone and (3) accelerating the slurry through a third zone which is horizontal and connects the first and second zone. Baffle arrangements are the preferred method of forming the zones.

---

This is a division of application Ser. No. 159,379, filed Dec. 14, 1961, now Patent No. 3,189,080, and a continuation of application Ser. No. 407,124, filed Oct. 28, 1964, now abandoned.

The invention relates to circulating a slurry of solids in a liquid of higher density than that of the solids to effect prolonged contact between the solids and the liquid and to maintain the solids in a dispersed condition within the liquid for any purpose. One such purpose is to cause volatile constitutents of the solids to be vaporized. The invention is, for example, applicable to effecting prolonged contact between synthetic elastomer polymer crumbs (sometimes called "rubber crumbs") with hot water to afford time for volatile hydrocarbon solvent contained in the crumbs to vaporize; however, the invention is not restricted to this application.

A specific example of application is the coagulation of olefin polymers, such as polybutadiene, from a solution in a volatile hydrocarbon solvent by mixing the solution with steam and hot water (usually condensate) to form polymer crumbs and vaporize the solvent, which escapes from the surface of the water. A part of the solvent remains in the porous, low-density crumbs, either occluded or in solution therewith, and prolonged contact of the crumbs with the hot water is required to effect further flashing of the solvent. Steam is often sparged into the water to supply heat. During this prolonged contact, it is important that the crumbs be kept separated and dispersed in the water and thereby prevented from forming larger masses or agglomerates, from which the solvent escapes more slowly. Mere agitation of the liquid contained in an unpartitioned vessel has been ineffective to insure separated movement of the crumbs.

A particular difficulty encountered in such operations is that of insuring entrainment of the solids in the liquid because they tend to float on the surface, where they remain in contact with each other to form agglomerates. Excessively high power expenditures are necessary to carry the crumbs downward from the liquid surface by means of submerged agitators operated in an unpartitioned vessel.

To draw the floating solids from the liquid surface it was found to be necessary to provide a well-defined down-flow channel, and to this end the vessel was subdivided by a vertical partition, such as a draft tube, into up-flow and down-flow zones which are in intercommunication at the top and bottom, and means to induce flow, such as an impeller, were provided in at least one of these channels to cause circulation. Although effective in certain systems, this still requires excessively high circulation rates, and therefore, high expenditures of power when the disparity in density between the solid and liquid is great and/or when a large amount of gas ascends, e.g., due to escape of vaporized solvent or admission of steam.

It is, therefore, an object of this invention to provide an improved method for promoting the circulation of solids in dispersion thereof in a liquid of greater density whereby the tendency for the solids to float at the surface is overcome. Ancillary thereto, it is an object to remove volatile constituents from solid particles by prolonged circulation of a slurry thereof in a heated liquid.

A further and specific object is to form an aqueous slurry of synthetic elastomer polymer from a solution of the polymer in a volatile hydrocarbon solvent and to free the resulting polymer crumbs from the said hydrocarbon solvent by circulating the said slurry within a containing vessel while maintaining the crumbs separated from each other.

Still another object is to improve the entrainment of light solids, such as synthetic elastomer crumbs, in a relatively denser liquid, such as water, which liquid is contained in a confining vessel and circulated through upflow and down-flow zones which are separated by a partition but are in intercommunication at the bottom and the top, by providing baffles to accelerate the flow of the liquid at the surface sufficiently to drag the floating solids down into the down-flow zones.

In summary, it was found that vaporization of the volatile constituents from solids, such as a hydrocarbon solvent from synthetic elastomer crumbs, can be effected by circulating a dispersion of such solids in a heated liquid, e.g., hot water, within a confining vessel successively through up-flow and down-flow zones which are in intercommunication at the bottom and at the top below the surface of the liquid and insuring a velocity at the liquid surface which is great enough to entrain the solids in the liquid entering the down-flow chanel. Steam may be introduced together with the feed stream and/or sparged into the body of liquid.

According to a further feature the said liquid velocity at the surface is brought about by means of a substantially horizontal baffle at the top of the partition between the up-flow and down-flow zones, said baffle being submerged a small distance below the liquid surface to obstruct partially the area of at least one of said zones and provide a shallow, horizontally elongated flow zone extending between said other zones, whereby the liquid must flow with high velocity at the surface and entrain the solids.

The invention will be further described with reference to the accompanying drawing forming a part of this specification and showing a preferred embodiment, wherein:

FIGURE 1 is an elevation view of a series of circulating vessels, both constructed in accordance with the invention and suitable for effecting vaporization of volatile material from solids;

FIGURE 2 is a sectional view of the lower part of one of the vessels, shown to an enlarged scale and taken on a vertical line 2—2 of FIGURE 3; and FIGURE 3 is a transverse sectional view taken on the broken horizontal line 3—3 of FIGURE 2.

Referring to the drawings in detail, 5 and 6 represent cylindrical circulating vessels serially connected by a transfer pipe 7, it being understood that any suitable number of such vessels may be used. The vessels are of like construction except for the inlet arrangements, but need not be of the same size. Each vessel may be closed, as shown, to facilitate recovery of solvent vapors and to permit operation at superatmospheric pressure. It contains a partition in the form of a cylindrical draft tube 8 mounted vertically and coaxially in spaced relation above the vessel bottom by radial baffles 9, 10, to define a central down-flow channel 11 and an annular up-flow channel 12. In the preferred embodiment shown the horizontal areas of the latter channel exceeds that of the former. To induce circulation an impeller or marine propeller 13 is mounted within the tube at the end of the shaft 14, which is driven by suitable drive means, such as an electric motor 15. The tube advantageously contains a plurality, e.g., four, vertical baffles 16 and the vessel may contain similar baffles 17, these baffles being for the purpose of reducing swirling motion of the liquid. A liquid slurry or a fluid stream from which a slurry of solids dispersed in a liquid can be formed is introduced into the first vessel 5 via an inlet pipe 18 and vapor is discharged therefrom through a vent pipe 19, which may be maintained at any desired pressure and lead to a solvent recovery system, not shown. The liquid is maintained to a predetermined level above the draft tube by any suitable means, such as an overflow weir pipe 20 which is, in the first vessel, connected to the transfer pipe 7. When the two vessels are operated at greatly different pressures a pressure-reducing valve 21 may be provided in the transfer pipe 7. The overflow weir pipe 20 of the second vessel leads to a discharge pipe 22. The vessels 5 and 6 may be of different capacities to afford different residence times. Thus, as shown, the weir 20 may be higher in the vessel 6 to give a larger residence time.

When liquid is circulated downward through the central channel 11 by the propeller 13 and upwards through the channel 12 there is a strong tendency for light solids to float and to accumulate as a more or less stagnant mass, principally near the vessel wall. Only at extremely high liquid flow rates can these solids be entrained in the liquid which flows down through the draft tube. To overcome this objectionable occurrence, there is provided an annular baffle 23 at the top of the tube, extending outwardly over outer channel so as to obstruct a part thereof. Typically the baffles cover from 0.2 to 0.8 of the area of the larger channel. Although the baffle is shown, in the preferred construction, to extend only over the upflow channel this is not restrictive of the invention. Similarly, the use of a smaller area for the downflow channel is not an absolute requirement but is preferable to facilitate the action of the propeller. To avoid the formation of a pocket beneath the baffle in which sticky solids may otherwise accumulate and to improve the flow pattern, it is desirable to mount a frusto-conical baffle 24 about the draft tube, the top end of this baffle being joined to the edge of the baffle 23. The flow area of the outer channel is thereby gradually diminished toward the top.

It should be noted that the level of the baffle 23 and the top of the draft tube is only a short distance below the surface of the liquid maintained in the vessel by the overflow weir pipe 20 and indicated at L. Typically, this distance is between about 0.5 to 1.5 of the radial extent of the annular width of the opening outside the baffle 23, so as to define above that baffle a shallow flow zone for the flow of liquid inwards with high velocity.

When applied for coagulating synthetic elastomer polymer from a hydrocarbon solution, said solution is supplied by a pipe 25 and steam from a supply pipe 26 is injected through a branch pipe 27 at a rate controlled by a valve 28 to cause flashing of the solvent and condensation of the steam. If desired, water may be introduced into the stream from a pipe 29 through a valve 30. Steam is admitted to the lower part of the vessel 6 from the pipe 26 via a valve 31 and to a sparger 32. It is evident that such a sparger may also be provided for the vessel 5.

Example

To form an aqueous slurry of polymer crumbs, a solution of polymerized butadiene in a solvent consisting of 20% by weight benzene and 80% $C_4$ hydrocarbons, principally butene, the polymer contents in said solution being about 10% by weight, is flowed at ambient temperature through the pipe 25 at a pressure of 55 lbs. per sq. inch gage and is mixed with saturated steam (303° F.) at the same pressure admitted through the pipe 27 in amounts 2 parts by weight of said solution to 1 part of steam. Water is also admitted from the pipe 29 in amount to cause the resultant slurry in the vessel 5 to contain about two to three parts by weight of rubber crumbs for 100 parts of water, which fills the vessel to the level of the overflow pipe 20. The steam causes rapid vaporization of the hydrocarbon solvent, which passes off into the space above the liquid and the polymer coagulated in the form of porous crumbs. This causes most of the steam to condense. The crumbs, still containing large amounts of the solvent, typically from 10 to 25%, are maintained in contact with the water by operating the propeller 13 so as to induce a downflow of the resultant slurry of crumbs in hot water through the draft tube 8 and an upflow in the annular channel 12. This causes additional amounts of the solvent to be vaporized to an extent dependent upon the residence time. The vaporized solvent, together with some steam, is discharged at a pressure between about 50 and 53 lbs. per sq. inch gage via the pipe 19.

In a preferred arrangement a series of such contacting vaporizing vessels is used in series, only two being shown for purposes of illustration. For example, an aqueous slurry containing crumbs from which over half of the solvent initially in the crumbs has been vaporized, is obtained after a residence time of two minutes, and is passed through the pipe 7 to the second vessel wherein additional vaporization occurs. This vessel may be operated at atmospheric pressure (212° F.) and additional steam is sparged into the slurry to supply heat. The hydrocarbon solvent content of the crumbs, in the effluent discharged at 22, after a long residence time, is typically from 0.1 to 2%.

The improvements due to the use of (1) partitioned up-flow and down-flow zones and (2) the horizontal baffle 23 are evidenced from the following: for an equivalent vaporization of hydrocarbon solvent from the polymer crumbs, the following amounts of power must be used for maintaining the crumbs dispersed in the liquid:

(A) With an unpartitioned vessel equipped with a conventional stirrer having paddles: Over 200 horsepower per 1,000 gallons of slurry.

(B) With the draft tube, but without the horizontal baffle: about 11 to 90 horsepower per 1,000 gallons of slurry, depending on the draft tube and propeller diameter.

(C) With the arrangement described: 4.5 horsepower per 1,000 gallons of slurry.

An advantage of the draft tube (B) as compared to the simple vessel (A) is that it permits the propeller to be small relative to the vessel diameter. Secondly, by making the horizontal area of the down-flow passage smaller, it permits high velocities therein at modest power levels while permitting low velocity in the up-flow zone. Typically, the area of the up-flow channel is from three to fifteen times that of the down-flow channel. Thirdly, it permits introduction of the volatile material into the up-flow channel (viz., the pipe 18 and the spargers 32 are situated near the vessel wall), whereby the ascending vapors will not interfere with the action of the propeller.

The advantage of the horizontal baffle of arrangement (C) may be explained as follows: When the baffle 23 and cone 24 are omitted, there is a tendency for the light polymer crumbs to float on the surface of the water, particularly near the vessel walls. This not only exposes them to the ascending vaporized solvent but causes them to form agglomerates from which the volatiles can escape less readily. To draw them downward into the draft tube exceedingly high liquid velocities are required.

With the arrangement shown there is a rapid upward movement of the slurry about the cone 24, resulting in a liquid surface as shown by the line L in FIGURE 2. This local turbulence and rapid movement entrains the crumbs and carries them into the draft tube with far lower liquid down-flow velocity through this tube.

Although the specific example given pertained to the preparation of an aqueous slurry of polybutadiene, it is obvious that the invention is not restricted thereto and that the physical action involved may be applied to a wide variety of materials, which may but need not be synthetic elastomers. Regarding such elastomers, it may be noted that it is known that varied useful elastomers may be produced from conjugated dienes wherein the elastomers have a high content of the cis, 1,4-addition product. The more useful of the cis 1,4-addition products are those prepared from isoprene and butadiene as they have properties suitable for application where natural rubber is used. The prior art describes the polymerization of conjugated dienes to produce cis 1,4-addition products, for example, by polymerizing isoprene with any of a large variety of hydrocarbyl lithium catalysts, such as n-butyl lithium, amyl lithium, and other normal alkyl lithiums from 2 to 10 carbon atoms. As another example, cis 1,4-polybutadiene may be prepared with a catalyst that is the reaction product of a transition metal compound, particularly halides, of a Group IV to VIII metal and a strong reducing agent, e.g., a metal compound, particularly organo-metallics, of a Group I to III metal. Other classes of highly useful elastomers are represented by the copolymers of ethylene and propylene, which are produced by polymerizing a mixture of the monomers with a catalyst comprising the reaction product of, for example, vanadium oxychloride and a reducing agent of the type previously described.

These polymerizations are conducted in the presence of liquid, inert, volatile solvents, such as isopentane, hexane, gasoline, benzene, toluene, and the like, and as the polymerization proceeds the elastomer forms and remains in solution until it is to be recovered. The coagulation method described above is one method of recovering the elastomer and permits these liquids to be removed to the extent that the elastomer contains less than 2% by weight, e.g., down to 0.1% of solvent. This high degree of removal of solvent leads to improved rubber products, since the presence of solvent causes the products to blister and weaken during vulcanization.

We claim:
1. A process for removing volatile constituents from a slurry of polymer crumbs dispersed in a hot liquid of higher density than that of the crumbs, the process comprising the steps of:
   moving said slurry downwardly through a first vertical circulation zone;
   moving said slurry upwardly through a second vertical circulation zone surrounding said first circulation zone and spaced therefrom at a flow velocity less than said slurry is moved through said first circulation zone;
   moving said slurry from said second circulation zone through a third horizontal circulation zone disposed above and spaced from said first and second circulation zones;
   accelerating said slurry across said third circulation zone and down through said first circulation zone at a rate sufficient to entrain said crumbs in said hot liquid entering said first circulation zone whereby said crumbs are maintained in prolonged contact with said hot liquid and separated from each other to effect progressive vaporization of said volatile constituents;
   discharging the vaporized volatile constituents from a space above said third circulation zone; and
   partially restricting the flow of said slurry from said second circulation zone into said third circulation zone so as to induce strong horizontal flow through said third circulation zone and thereby entrain said crumbs from the surface of said liquid in said second circulation zone.

References Cited
UNITED STATES PATENTS

| | | | |
|---|---|---|---|
| 2,953,556 | 9/1960 | Wolfe et al. | 260—29.7 |
| 3,189,080 | 8/1967 | Overcashier et al. | 260—29.7 |
| 3,056,772 | 11/1962 | Wallace | 260—94.7 |

MURRAY TILLMAN, Primary Examiner

JOHN T. GOOLKASIAN, Assistant Examiner

U.S. Cl. X.R.

260—96, 29.7, 85.1, 29.6; 202—175; 159—45, 47